(12) United States Patent
Kim

(10) Patent No.: US 7,129,957 B2
(45) Date of Patent: Oct. 31, 2006

(54) COLOR SIGNAL PROCESSING DEVICE AND METHOD

(75) Inventor: Moon-cheol Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 10/698,488

(22) Filed: Nov. 3, 2003

(65) Prior Publication Data

US 2004/0119721 A1 Jun. 24, 2004

(30) Foreign Application Priority Data

Dec. 20, 2002 (KR) .................. 10-2002-0081646

(51) Int. Cl.
*G09G 5/02* (2006.01)
(52) U.S. Cl. ................. 345/603; 345/589; 345/597; 345/600; 345/604
(58) Field of Classification Search ............... 345/589, 345/597, 600, 603, 604; 382/162
See application file for complete search history.

(56) References Cited

U.S. PATENT DOCUMENTS 3,564,226 A * 2/1971 Seligman ............... 708/490
6,510,242 B1 * 1/2003 Westerman ............... 382/162
2004/0109180 A1 * 6/2004 Braun et al. ............... 358/1.9

OTHER PUBLICATIONS

U.S. Appl. No. 10/352,942, filed Jan. 29, 2003, Moon-cheol Kim et al.

* cited by examiner

*Primary Examiner*—Kee M. Tung
*Assistant Examiner*—Tam Tran
(74) *Attorney, Agent, or Firm*—Staas & Halsey LLP

(57) ABSTRACT

A color signal processing device and method thereof include a conversion unit converting an input image signal into an RGB color signal, a change rate calculation unit calculating change rates of the RGB color signal when the RGB color signal changes with respect to change rates of a color difference signal on boundaries of a color space of the RGB color signal, and a color gamut decision unit determining a displayable scope of color chroma based on the change rates of the RGB color signal with respect to the change rates of the color difference signal and when the detected RGB color signal exists on the boundaries of the color space of the RGB color signal.

41 Claims, 7 Drawing Sheets

COLOR SIGNAL PROCESSING DEVICE AND METHOD

CROSS-REFERENCE TO RELATED APPLICATIONS

This application claims the priority of Korean Patent Application No. 2002-81646, filed on Dec. 20, 2002 in the Korean Intellectual Property Office, the disclosure of which is incorporated herein by reference.

BACKGROUND OF THE INVENTION

1. Field of the Invention

The present invention relates to a device and a method to process a color signal input to a display device, and more particularly, to a color signal processing device and method to precisely and simply calculate a maximum color chroma of an input video signal in relation with a hue and a luminance in a color space.

2. Description of the Related Art

Substantial colors refer to color objects that are emitted when a light is permeated through, absorbed into, and reflected by the color objects. The substantial colors are mainly classified into achromatic colors having various degrees of brightness and darkness without a hue, such as white, gray, and black, and chromatic colors having the hue, such as red, blue, and so on. Any color having the hue, even a bit, can be referred to as one of the chromatic colors because the chromatic colors include the hue.

Like the white color is bright, the black color is dark, and the gray color has an average brightness, degrees of brightness or darkness indicate that quantifying a visual intensity of the light reflected by the color object is referred to as the brightness. It is typically considered that a yellow color of a melon is bright, and a purple color of a grape is dark, the brightness exists even in the chromatic colors.

Further, as in the red, the yellow, green, the blue, and the purple colors, the hue is perceived by human beings as a result of the light having diverse wavelengths and illuminating the color objects. For example, wavelengths in a range of 430 to 480 nanometers give a strong feeling of the blue color. Furthermore, the yellow color is felt in a range of 570 to 600 nanometers, and wavelengths of over 610 nanometers are classified as the red color. The achromatic colors such as the black, gray, and white colors each have the color, but not the hue.

Further, differences of high and low color concentrations, that is, degrees of colors not diluted with the white color are referred to as chroma. The chroma indicates a purity of the colors. The colors having a low chroma are washed-out or faded, while the colors having a high chroma are distinct and vivid. The chromatic colors have the chroma, the hue, and the brightness, but the achromatic colors can be referred to as particular colors having the brightness only without the hue and the chroma. As such, the hue, the brightness, and the chroma are referred to as three-color attributes.

Further, a method representing relations among the colors is referred to as a color space or a color model. Different image processing systems have different color models due to different reasons. For example, companies publishing color pictures use a CMY color space. An RGB color space is used for color cathode ray tube (CRT) monitors and computer graphic systems. An HIS color space is employed for systems dealing with the hue, the chroma, and the brightness. Further, the YCbCr color space is used for a JPEG File Interchange Format (JFIF) and the like.

In here, the RGB color space includes the red, green, and blue colors, referred to as three primary colors that can be added with one another. Spectral elements of the colors are additionally combined to obtain resultant colors. As shown in FIG. 1, the RGB color space is represented as a three-dimensional cube having axes representing the red, green, and blue colors, respectively. An origin represents the black color. The white color is at an opposite end of the black color in the cube. The brightness is represented along a line from the black color to the white color. The red color(R) is represented in (255, 0, 0) in 24-bit color graphic systems having 8 bits per color channel, and in (1, 0, 0) in the color cube.

The YCbCr color space is a color space separating light intensity from color information. Y denotes luminance, Cb is a blue color difference signal, and Cr is a red color difference signal. If the RGB is converted into the YCbCr, the Cb has a significant amount of the blue color, and the Cr has a significant amount of the red color. Whereas the RGB signals have the same bandwidth, a CbCr color difference signal of YCbCr signals can be effectively used because a bandwidth of the YCbCr signals is reduced.

The luminance represents the degree of image brightness, and pixel luminance is represented in 8 bits in the ITU-R 601 standard (formerly, CCIR standard). A color difference represents a degree of the image color, and using double 8 bits in the ITU-R 601 standard represents a pixel color. The YCbCr used for MPEG represents a pixel in information of triple 8 bits of luminance Y and color differences Cb and Cr.

Because human eyes are more sensitive to the luminance signal Y compared to the color difference signals Cb and Cr, the Cb and Cr signals are sampled to reduce corresponding data amounts. At this time, a color format not sampled is specified in 4:4:4, a format in case that the color signal is once sampled is specified in 4:2:2, and a format in case sampled once more is specified in 4:2:0. The 4:4:2, 4:2:2, and 4:2:0 formats each refer to a sampling frequency ratio of a luminance signal and two color difference signals. The 4:2:0 format alternately becomes the 4:2:0 format and the 4:2:2 format in odd-numbered lines and even-numbered lines, and one of the formats becomes a representative value, which is specified in the 4:2:0 format. That is, the color information not reduced is referred to as the 4:4:4 format, the color information reduced in half in a traverse direction is referred to as the 4:2:2 format, and the color information reduced in half in both traverse and lengthwise directions is referred to as the 4:2:0 format. Accordingly, the color information becomes one fourth of the luminance information in the 4:2:0 format.

Formula 1 shows one exemplary method converting the RGB into the YCbCr.

$$Y = 0.29900R + 0.58700G + 0.11400B$$

$$Cb = -0.16874R - 0.33126G + 0.50000B$$

$$Cr = 0.50000R - 0.41869G - 0.08131B \qquad \text{Formula 1}$$

To the contrary, Formula 2 shows an exemplary method converting the YCbCr into the RGB.

$$R = 1.00000Y + 1.40200Cr$$

$$G = 1.00000Y - 0.34414Cb - 0.71414Cr$$

$$B = 1.00000Y + 1.177200Cb \qquad \text{Formula 2}$$

FIG. 2 shows a color gamut expressed in the YCbCr color space for the colors represented in the RGB color space according to the method expressed in Formula 1.

The above Formulas 1 and 2 are the International Radio Consultative Committee (CCIR) 601-1 standard, which is a typical method used in the Joint Photographic Experts Group (JPEG). In addition to Formulas 1 and 2, there are various methods to convert the YCbCr into the RGB or vice versa.

Digital components convert the input RGB color signal into the YCbCr color signal for display. Further, the color signal expressed in the YCbCr is processed into the digital signal, and then converted into the RGB signal for display.

However, during converting the RGB color signal into the color signal of YCbCr or the like and then processing the converted signal into a digital signal, conversions made into colors unable to be expressed in the RGB color space may occur. In this case, the processed color signal may be out of the color gamut capable of being displayed.

SUMMARY OF THE INVENTION

According to an aspect of the present invention, there is provided a device and a method to simply process color signals without a memory storing color gamut coordinate values, in addition to preventing that converted color signals go beyond a displayable color gamut.

According to an aspect of the present invention, there is provided a color signal processing device including a display unit; a luminance_color difference signal conversion unit converting an input image signal into a luminance_color difference signal; a change rate detection unit detecting a change rate of a color difference signal when the color difference signal changes with hue and luminance remaining constant in a color space of the luminance_color difference signal; an RGB color signal conversion unit converting the luminance_color difference signal into an RGB color signal, wherein the display unit displays the RGB color signal; a detection unit detecting the RGB color signal changing in a color space of the RGB color signal according to the changes of the color difference signal; and a color gamut decision unit determining a color chroma scope based on a change rate of the RGB color signal according to the change rate of the color difference signal when the detected RGB color signal exists on a color space boundary of the RGB color signal and displaying the color chroma scope on the display unit.

Here, the luminance_color difference signal conversion unit converts the image signal into a YCbCr color signal, or may be implemented to convert the image signal into any one of a YCbCr signal, a YIQ signal, and a YUV signal.

Further, the RGB color signal conversion unit converts the luminance_color difference signal into the RGB color signal through a matrix as follows:

$$\begin{pmatrix} R \\ G \\ B \end{pmatrix} = M \begin{pmatrix} Y \\ C_b \\ C_r \end{pmatrix}$$

where M denotes a conversion matrix of 3×3, that is, $$M = \begin{pmatrix} a & b & c \\ d & e & f \\ g & h & i \end{pmatrix}.$$

The detection unit detects changes of the RGB color signal through a formula as follows:

$$R^* = a \cdot Y + b \cdot k \cdot Cb + c \cdot k \cdot Cr = a \cdot Y + k \cdot (b \cdot Cb + c \cdot Cr) = R_{init} + k \cdot \Delta R$$

$$G^* = d \cdot Y + e \cdot k \cdot Cb + f \cdot k \cdot Cr = d \cdot Y + k \cdot (e \cdot Cb + f \cdot Cr) = G_{init} + k \cdot \Delta G$$

$$B^* = g \cdot Y + h \cdot k \cdot Cb + i \cdot k \cdot Cr = g \cdot Y + k \cdot (h \cdot Cb + i \cdot Cr) = B_{init} + k \cdot \Delta B$$

Wherein, $R_{init} = a \cdot Y$, $G_{init} = d \cdot Y$, $B_{init} = g \cdot Y$, k denotes a change rate of the color difference signal, $\Delta R = (b \cdot Cb + c \cdot Cr)$, $\Delta G = (e \cdot Cb + f \cdot Cr)$, $\Delta B = (h \cdot Cb + i \cdot Cr)$, and $R^*$, $G^*$, and $B^*$ denotes the RGB color signal converted by the RGB color signal conversion unit.

According to an aspect of the present invention, the color signal processing device further includes a change rate calculation unit calculating the charge rate of the RGB color signal when the RGB color signal changes according to the changes of the color difference signal and exists on a color space boundary of the RGB color signal. Further, the change rate calculation unit calculates a change rate of the RGB color signal through a formula as follows:

$$k_R = \frac{R^* - R_{init}}{\Delta R}; k_G = \frac{G^* - G_{init}}{\Delta G}; k_B = \frac{B^* - B_{init}}{\Delta B}$$

Wherein, $k_R$ denotes a change rate of a red color(R) signal, $k_G$ a change rate of a green color (G) signal, and $k_B$ a blue color (B) signal.

According to an aspect of the present invention, the color gamut decision unit comprises a minimum change rate selection unit selecting a minimum change rate of the change rates, $k_R$, $k_G$, and $k_B$, of the RGB color signal, which are calculated by the change rate calculation unit, and the color gamut decision unit determines the chroma scope based on the selected minimum change rate. In this case, the color gamut decision unit determines the chroma scope based on an inverse number of the minimum change rate selected by the minimum change rate selection unit.

In the meantime, a color signal processing method, according to an aspect of the present invention, includes converting an input image signal into a luminance_color difference signal; detecting a change rate of a color difference signal when the color difference signal changes with hue and luminance remaining constant in a color space of the luminance_color difference signal; converting the luminance_color difference signal into an RGB color signal; displaying the RGB color signal; detecting the RGB color signal changing in a color space of the RGB color signal according to changes of the color difference signal; determining a color chroma scope based on a change rate of the RGB color signal according to the change rate of the color difference signal when the detected RGB color signal exists on a color space boundary of the RGB color signal; and displaying the color chroma scope.

According to an aspect of the present invention, there is provided a color signal processing device, including a conversion unit converting an input image signal into an RGB color signal; a change rate calculation unit calculating change rates of the RGB color signal when the RGB color signal changes with respect to change rates of a color difference signal on boundaries of a color space of the RGB color signal; and a color gamut decision unit determining a displayable scope of color chroma based on the change rates of the RGB color signal with respect to the change rates of the color difference signal and when the detected RGB color signal exists on the boundaries of the color space of the RGB color signal.

According to an aspect of the present invention, there is provided a color signal processing method, including: converting an input image signal into an RGB color signal; calculating change rates of the RGB color signal when the RGB color signal changes with respect to change rates of a color difference signal on boundaries of a color space of the RGB color signal; and determining a displayable scope of color chroma based on the change rates of the RGB color signal with respect to the change rates of the color difference signal and when the detected RGB color signal exists on the boundaries of the color space of the RGB color signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
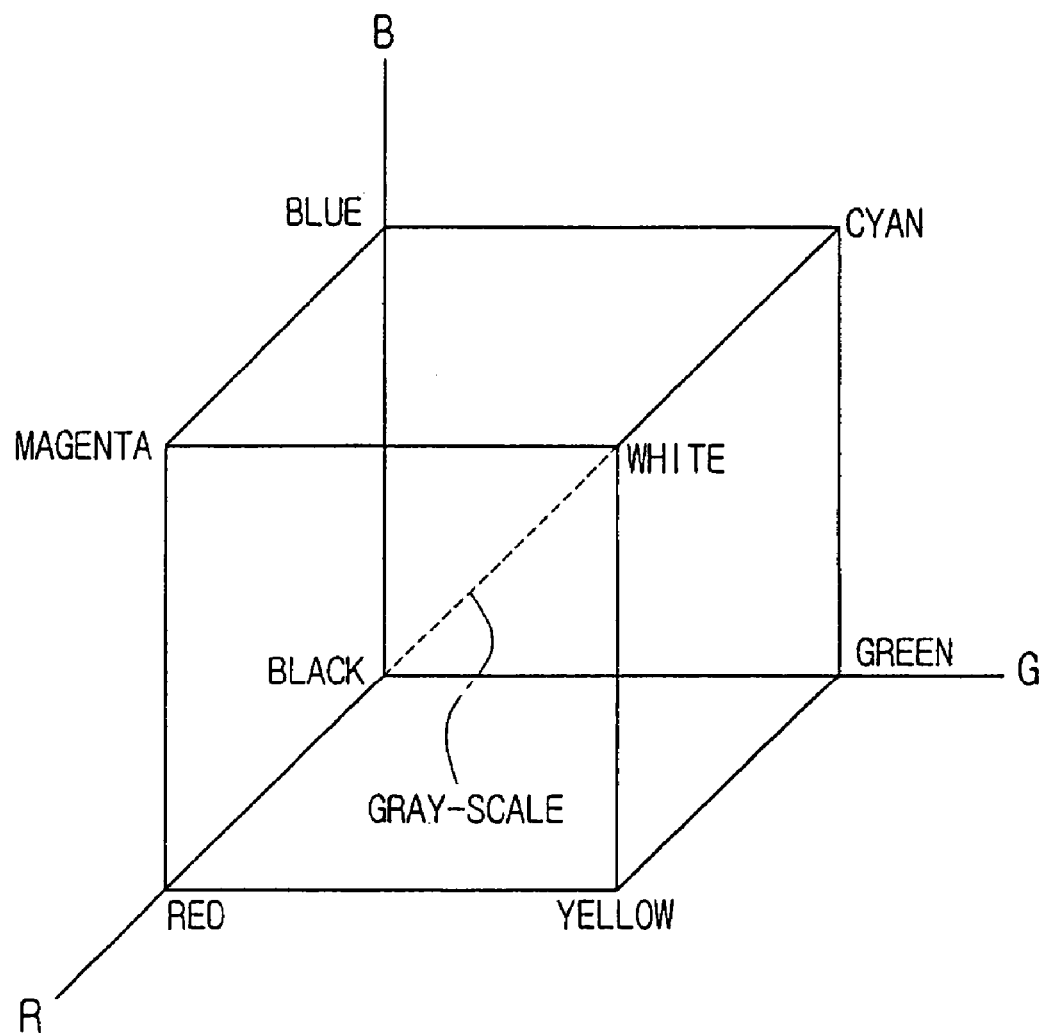
FIG. 1 is a view showing an RGB color space.

Reference will now be made in detail to the present aspects of the present invention, examples of which are illustrated in the accompanying drawings, wherein like reference numerals refer to like elements throughout.

Figure 3:
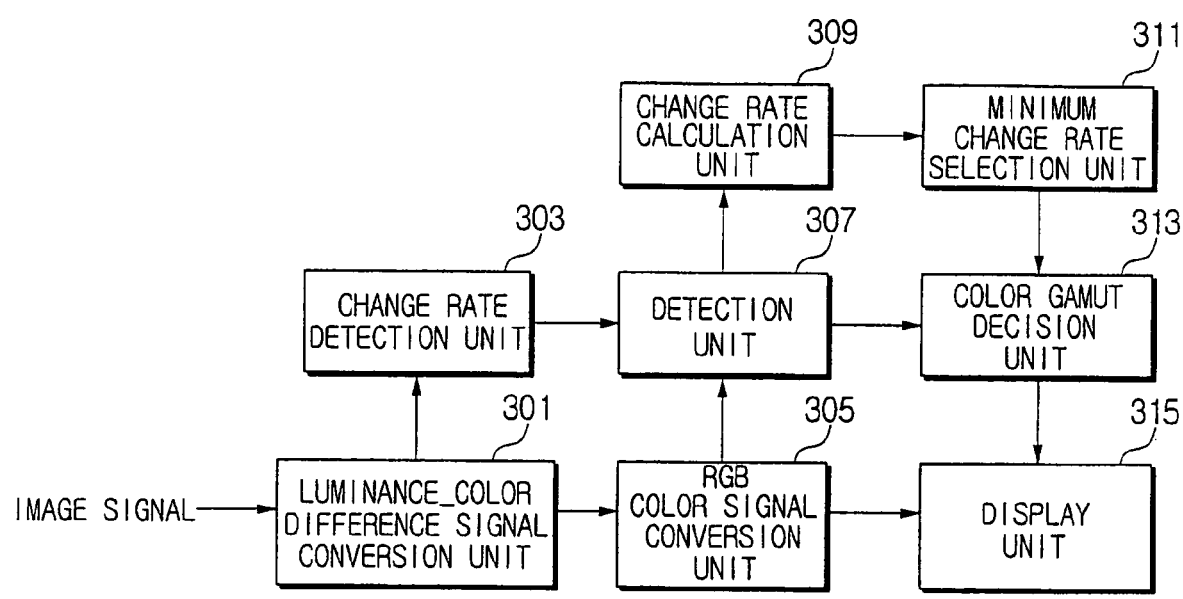
FIG. 3 is a block diagram schematically showing a color signal processing device, according to an aspect of the present invention.

FIG. 3 is a block diagram schematically showing a color signal processing device, according to an aspect of the present invention. In FIG. 3, the color signal processing device has a luminance_color difference signal conversion unit 301, a conversion rate detection unit 303, an RGB color signal conversion unit 305, a detection unit 307, a change rate calculation unit 309, a minimum change rate selection unit 311, and a color gamut decision unit 313. The RGB color signal conversion unit 305 and the color gamut decision unit 313 of the color signal processing device are connected to a display unit 315.

The luminance_color difference signal conversion unit 301 converts an input image signal into the luminance_color difference signal. In this case, the luminance_color difference signal is one of a YCbCr signal, a YIQ signal, and a YUV signal. Hereinafter, descriptions are made on a case that a luminance_color difference signal is the YCbCr signal.

The change rate detection unit 303 detects a change rate of a color difference signal when the color difference signal changes to a CbCr signal while constantly maintaining color and luminance in a color space of the luminance_color difference signal, that is, the YCbCr signal.

The RGB color signal conversion unit 305 converts the YCbCr signal into an RGB color signal displayable on the display unit 315. The detection unit 307 detects the RGB color signal changing in a color space of the RGB color signal with respect to change rates of the color difference signal.

The change rate calculation unit 309 calculates change rates of the RGB color signal in case that the RGB color signal changes with respect to changes of the color difference signal on boundaries of the color space of the RGB color signal. In this case, the change rate of the RGB color signal refers to a change rate of each of a red color (R) signal, a green color (G) signal, and a blue color (B) signal.

The minimum change rate selection unit 311 selects a minimum change rate from the change rates of the RGB color signal calculated by the change rate calculation unit 309. The color gamut decision unit 313, when the detected RGB color signal exists on boundaries of the color space of the RGB color signal, determines a scope of color chroma displayable on the display unit 315 based on the change rates of the RGB color signal corresponding to the change rates of the color difference signal. At this time, the color gamut decision unit 313 determines the scope of the color chroma based on the minimum change rate selected by the minimum change rate selection unit 311.

Figure 4:
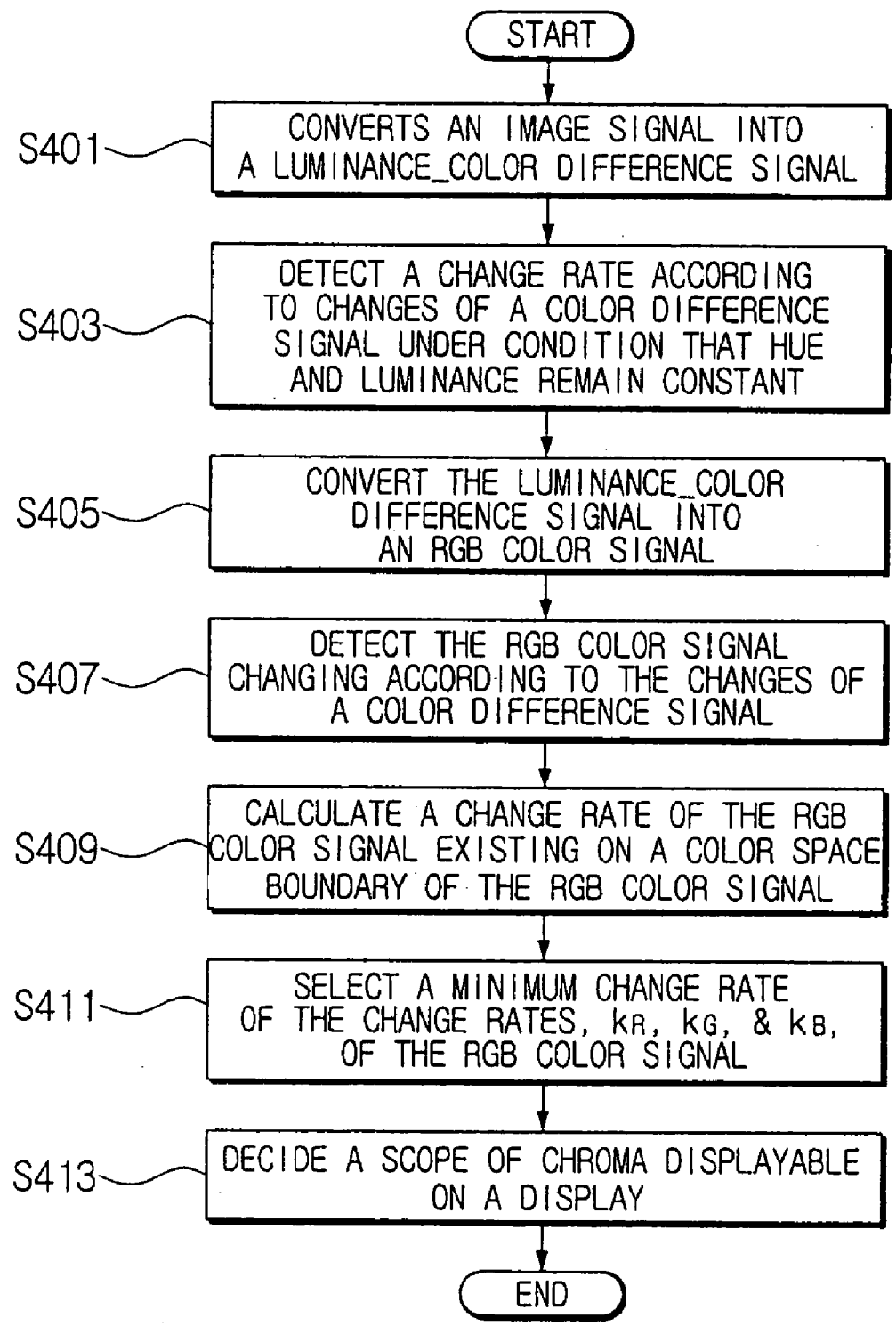
FIG. 4 is a flow chart showing a color signal processing method for FIG. 13.

FIG. 4 is a flow chart showing a color signal processing method FIG. 3. The present invention will be described in more detail with reference to the accompanying drawings.

Figure 2:
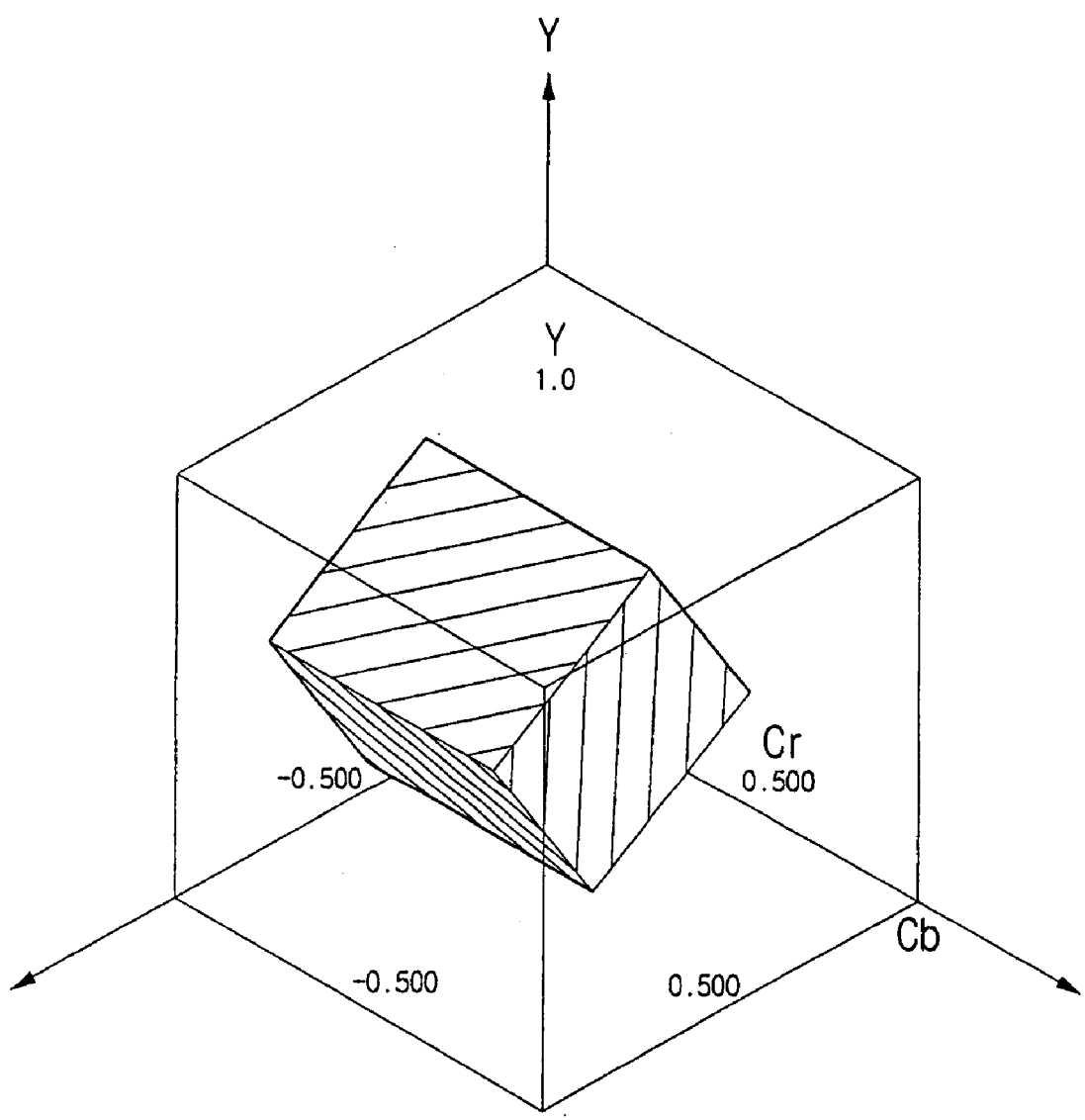
FIG. 2 is a view showing an YCbCr color space.
Figure 5:
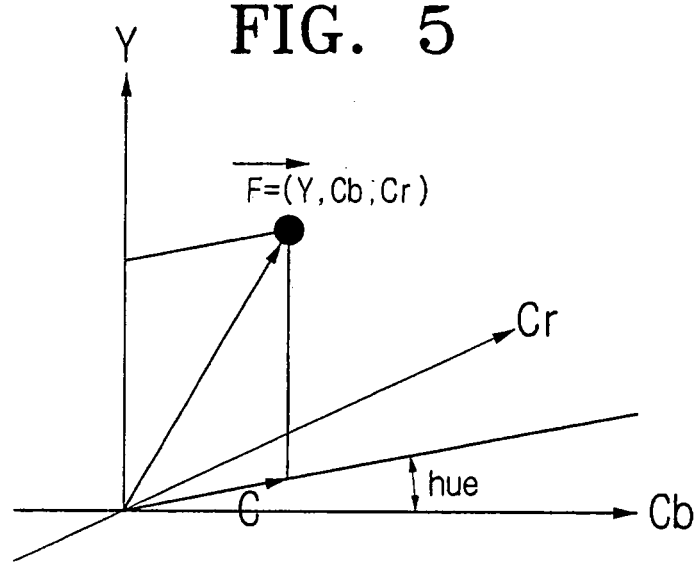
FIG. 5 is a view illustrating a coordinate value of an image signal in the YCbCr color space.

At operation S401, the luminance_color difference signal conversion unit 301 converts the input image signal into the luminance_color difference signal, that is, the YCbCr signal. The converted luminance_color difference signal exists in the color space of the YCbCr signal, and the color space of the YCbCr signal is the same as shown in FIG. 2. At this time, if the coordinate value in the color space of the YCbCr signal of the input image signal is denoted as F, the coordinate value F is denoted as shown in FIG. 5. In this case, a color chroma C and a hue H of the image signal are calculated based on Formula 3 as below.

$$C = \sqrt{Cb^2 + Cr^2}$$
$$H = \arctan\left(\frac{Cr}{Cb}\right)$$

Figure 6:
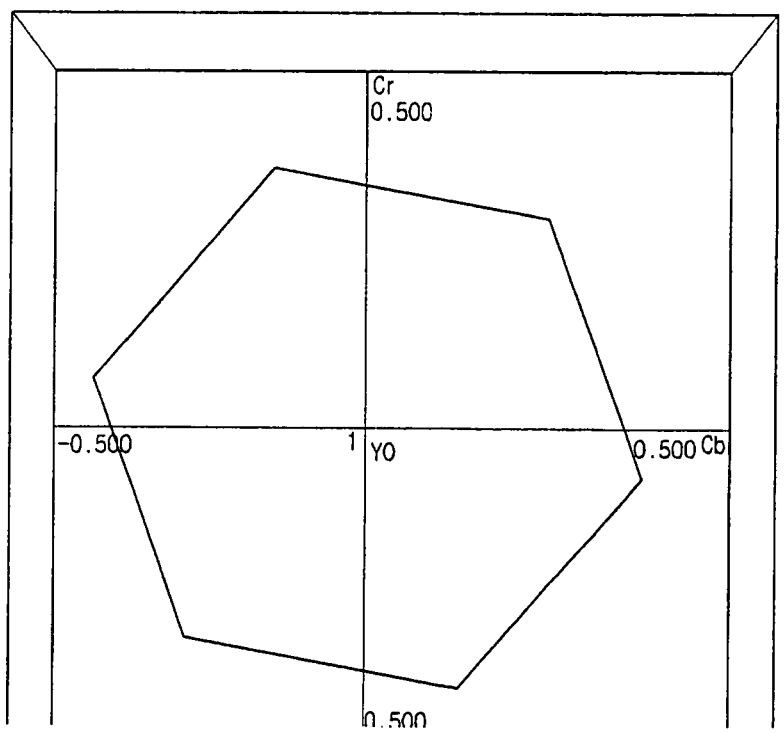
FIG. 6 is a view showing color distribution viewed along a Y-axis of the YCbCr color space.
Figure 7:
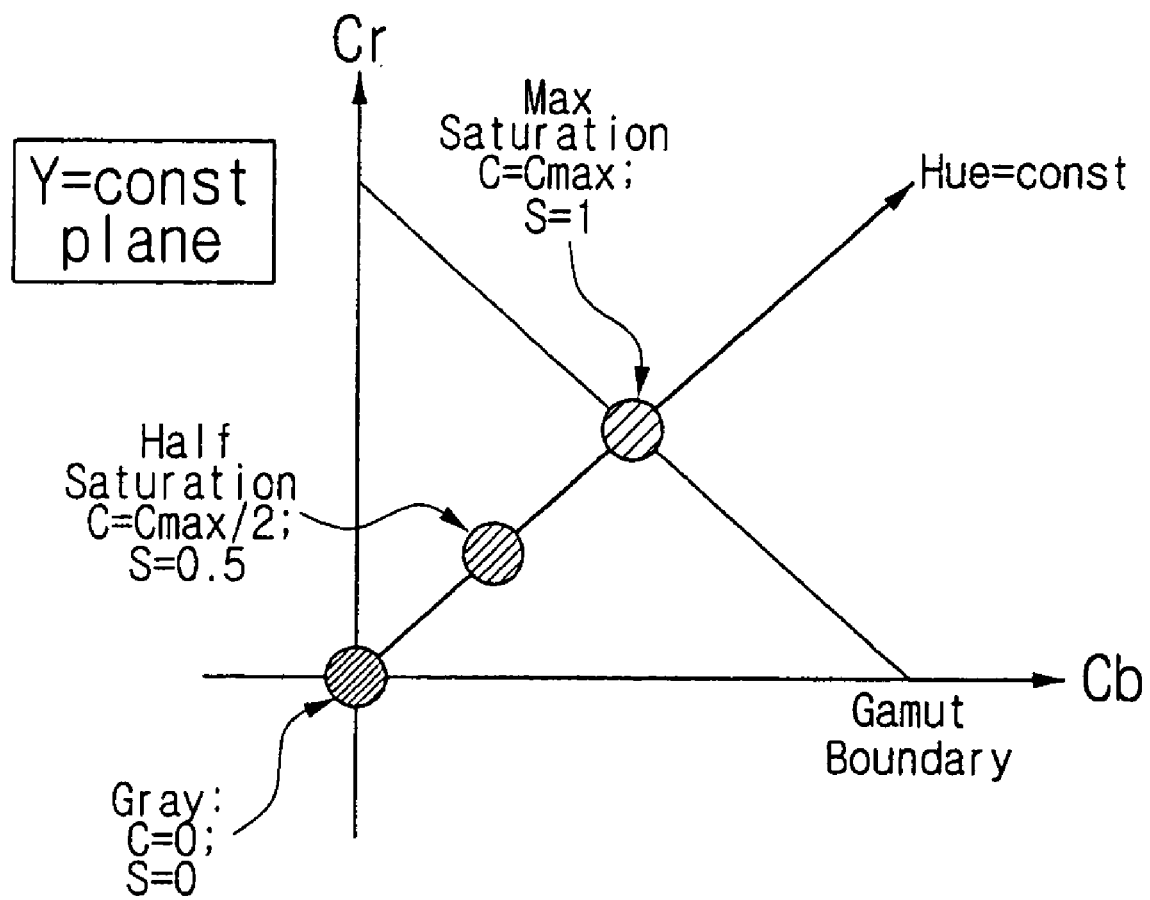
FIG. 7 is a view showing shifts of the image signal when luminance and hue are constant.

At operation S403, the change rate detection unit 303 detects the change rate of the color difference signal when the color difference signal, that is, the CbCr signal changes while constantly maintaining the hue and the luminance in the color space of the luminance_color difference signal, that is, the YCbCr signal. A plan view showing color distribution viewed along the Y axis in the YCbCr color space is shown in FIG. 6. At this time, if the luminance Y and the hue H of the input image signal are constant, coordinate values at that time exist on a straight line passing through the origin of the CbCr plane as shown in FIG. 7. At this time, a straight line intersecting Cb and Cr axes and passing the line along which coordinate values are indicated illustrates boundary values of the YCbCr color space when the luminance Y is constant. The and positions of the coordinate values of the image signal.

Referring to FIG. 7, in case that the luminance Y and the hue H are constant, the chroma of input image signal exists between an intersection point(origin) of the Cb and Cr axes and a cross point with a boundary value. In this case, the chroma ratio of the image signal can be expressed as shown by Formula 4 below.

$$S = \frac{C}{C_{max}}$$  Formula 4]

Here, S denotes a ratio of the chroma of the input image signal C to the maximum chroma ($C_{max}$) of the same under a condition that the image signal C has the luminance Y and the hue C without variation.

At operation S405, the RGB color signal conversion unit 305 converts the YCbCr signal into the RGB signal displayable on the display unit 315. At this time, an equation to convert the YCbCr signal into the RGB color signal can be expressed as below.

$$\begin{pmatrix} R \\ G \\ B \end{pmatrix} = M \begin{pmatrix} Y \\ C_b \\ C_r \end{pmatrix}$$  Formula 5]

Where M denotes a conversion matrix of 3×3, that is, $$M = \begin{pmatrix} a & b & c \\ d & e & f \\ g & h & i \end{pmatrix}.$$

and lowercase alphabet letters a~i denote elements of the matrix M.

When the color difference signal is changed by the change rate detection unit 305 in the YCbCr color space with the luminance and the hue constant, the RGB color signal in the RGB color space also changes. At operation S407, the detection unit 307 detects the RGB color signal changing in the RGB color space with respect to the changes of the color difference signal, that is, CbCr. A method of the detection unit 307 to detect the RGB color signal can be expressed as shown in Formula 6 below.

$R^* = a \cdot Y + b \cdot k \cdot Cb + c \cdot k \cdot Cr = a \cdot Y + k \cdot (b \cdot Cb + c \cdot Cr) = R_{init} + k \cdot \Delta R$ $G^* = d \cdot Y + e \cdot k \cdot Cb + f \cdot k \cdot Cr = d \cdot Y + k \cdot (e \cdot Cb + f \cdot Cr) = G_{init} + k \cdot \Delta G$ $B^* = g \cdot Y + h \cdot k \cdot Cb + i \cdot k \cdot Cr = g \cdot Y + k \cdot (h \cdot Cb + i \cdot Cr) = B_{init} + k \cdot \Delta B$  Formula 6]

Here, $R_{init}$=a·Y, $G_{init}$=d·Y, $B_{init}$=g·Y, k denotes a change rate of the color difference signal, $\Delta R$=(b·Cb+c·Cr), $\Delta G$=(e·Cb+f·Cr), $\Delta B$=(h·Cb+i·Cr), and R*, G*, and B* denotes the RGB color signal converted by the RGB color signal conversion unit 305.

At operation S409, the change rate calculation unit 309 calculates the change rate of the RGB color signal when the RGB color signal, changed with respect to the change of the color difference signal, exists on the color space boundaries of the RGB color signal. In this case, the change rate of the RGB color signal refers to the change rate of each of the red color(R) signal, the green color (G) signal, and the blue color (B) signal. That is, if the change rates of the R signal, the G signal, and the B signal are referred to as $k_R$, $k_G$, and $k_B$, respectively, the RGB color signal may be expressed as shown below.

$R^* = R_{init} + k_R \cdot \Delta R$ $G^* = G_{init} + k_G \cdot \Delta G$ $B^* = B_{init} + k_B \cdot \Delta B$  Formula 7]

From Formula 7, corresponding change rates of $k_R$, $k_G$, and $k_B$ are calculated as shown below.

$$k_R = \frac{R^* - R_{init}}{\Delta R}; k_G = \frac{G^* - G_{init}}{\Delta G}; k_B = \frac{B^* - B_{init}}{\Delta B}$$  Formula 8]

When corresponding change amounts, $\Delta R$, $\Delta G$, and $\Delta B$, increase with respect to boundary values of the RGB color space, R*, G*, and B* become "1", and, in the other cases, R*, G*, and B* become "0". This can be expressed as shown in Formula 9 as follows.

if($\Delta R$>0)R*=1; else R*=0;

if($\Delta G$>0)G*=1; else G*=0;

if($\Delta B$>0)B*=1; else B*=0.  Formula 9]

At operation S411, the minimum change rate selection unit 311 selects a minimum change rate from the respective change rates, $k_R$, $k_G$, and $k_B$, of the RGB color signal calculated by the change rate calculation unit 309 because, as the change rate between boundary values and values changed by the RGB color signal conversion unit 305 in the RGB color space become smaller, a color gamut displayable on the display unit becomes larger.

At operation S413, the color gamut decision unit 313, when the detected RGB color signal exists on the color space boundary values of the RGB color signal, determines the chroma scope displayable on the display unit 315 based on the change rate of the RGB color signal with respect to the change rate of a color difference signal. At this time, the color gamut decision unit 313 determines the chroma scope based on the minimum change rate selected by the minimum change rate selection unit 311. That is, the color gamut decision unit 313 takes an inverse number of the minimum change rate selected by the minimum change rate selection unit 311, and calculates chroma ratio of the color signal converted by the RGB color signal conversion unit 305 to the boundary values in the RGB color space. The color gamut decision unit 313 determines the chroma scope of the display unit 315 based on the calculated chroma ratio.

Figure 8A:
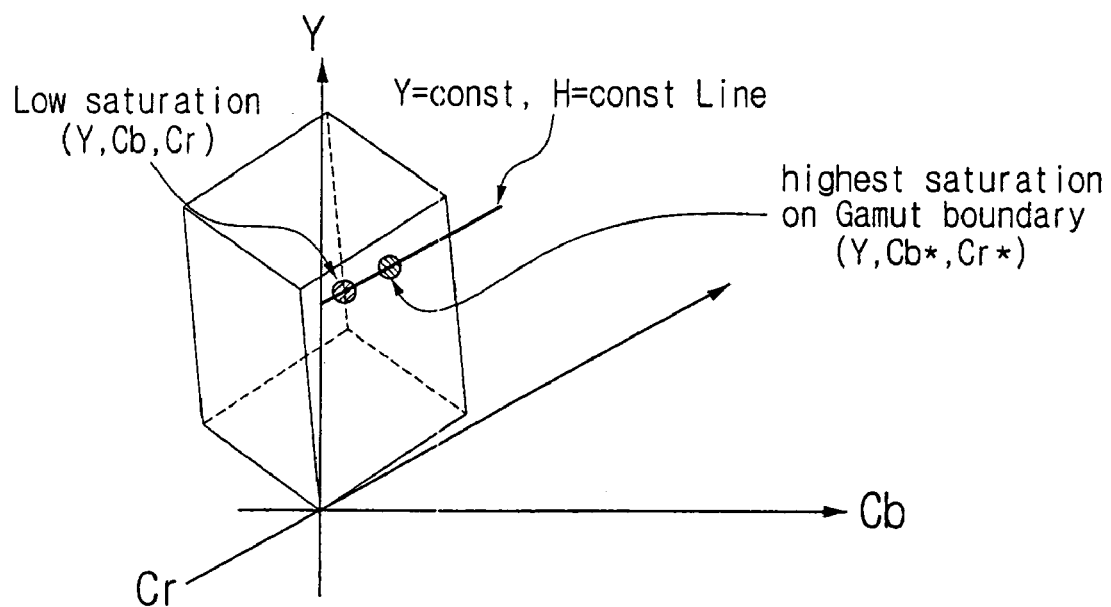
FIG. 8A and FIG. 8B are views explaining a concept of the present invention in a color space.
Figure 8B:
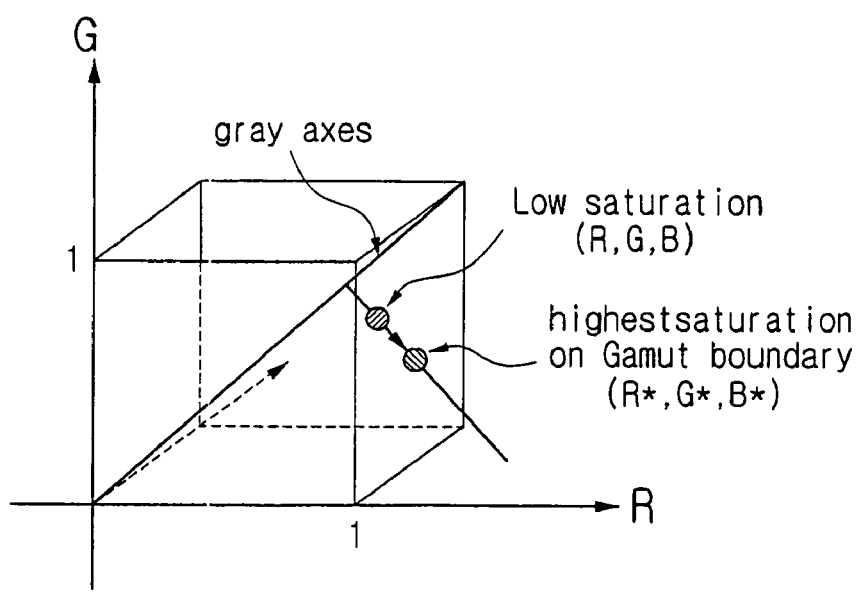

FIGS. 8A and 8B are views illustrating an aspect of the present invention in the color space, FIG. 8A shows the YCbCr color space, and FIG. 8B shows the RGB color space.

In FIGS. 8A and 8B, if the luminance and the hue in the YCbCr color space remain constant, the coordinate vales of the image signal exist on the straight line parallel with the CbCr plane. At this time, if the color difference signal changes under a condition that the corresponding luminance and hue remain constant, the coordinate values of the corresponding RGB color signal vary in the RGB color space. FIG. 8B shows a case that the RGB color signal changes along a gray axis and a straight line passing the GB plane in the RGB color space. Through the above method, a displayable chroma scope for an image signal in the RGB color space can be calculated.

The present invention calculates a chroma scope displayable for an input image signal so that a color signal identical to the input image signal can be displayed, and does not require a memory to store coordinate values when calculating the chroma scope. Further, according to an aspect of the present invention, errors in calculating the chroma scope may be reduced, compared to a conventional method, to thereby enable color signals to be more precisely processed.

Although a few aspects of the present invention have been shown and described, it will be appreciated by those skilled in the art that changes may be made in these aspects without departing from the principles and spirit of the invention, the scope of which is defined in the claims and their equivalents.

What is claimed is:

1. A color signal processing device, comprising:
   a display unit;
   a luminance_color difference signal conversion unit converting an input image signal into a luminance_color difference signal;
   a change rate detection unit detecting a change rate of a color difference signal when the color difference signal changes with hue and luminance remaining constant in a color space of the luminance_color difference signal;
   an RGB color signal conversion unit converting the luminance_color difference signal into an RGB color signal, wherein the display unit displays the RGB color signal;
   a detection unit detecting the RGB color signal changing in a color space of the RGB color signal according to the changes of the color difference signal; and
   a color gamut decision unit determining a color chroma scope based on a change rate of the RGB color signal according to the change rate of the color difference signal when the detected RGB color signal exists on a color space boundary of the RGB color signal and displaying the color chroma scope on the display unit.

2. The color signal processing device as claimed in claim 1 wherein the luminance_color difference signal conversion unit converts the image signal into any one of a YCbCr signal, a YIQ signal, and a YUV signal.

3. The color signal processing device as claimed in claim 1 wherein the luminance_color difference signal conversion unit converts the image signal into a YCbCr color signal.

4. The color signal processing device as claimed in claim 3, wherein the RGB color signal conversion unit converts the luminance_color difference signal into the RGB color signal through a matrix as follows:

$$\begin{pmatrix} R \\ G \\ B \end{pmatrix} = M \begin{pmatrix} Y \\ C_b \\ C_r \end{pmatrix}$$

where M denotes a conversion matrix of 3×3, comprising, $$M = \begin{pmatrix} a & b & c \\ d & e & f \\ g & h & i \end{pmatrix}.$$

5. The color signal processing device as claimed in claim 4, wherein the detection unit detects the changes of the RGB color signal through a formula as follows:

$$R^* = a \cdot Y + b \cdot k \cdot Cb + c \cdot k \cdot Cr = a \cdot Y + k \cdot (b \cdot Cb + c \cdot Cr) = R_{init} + k \cdot \Delta R$$

$$G^* = d \cdot Y + e \cdot k \cdot Cb + f \cdot k \cdot Cr = d \cdot Y + k \cdot (e \cdot Cb + f \cdot Cr) = G_{init} + k \cdot \Delta G$$

$$B^* = g \cdot Y + h \cdot k \cdot Cb + i \cdot k \cdot Cr = g \cdot Y + k \cdot (h \cdot Cb + i \cdot Cr) = B_{init} + k \cdot \Delta B$$

wherein, $R_{init}=a \cdot Y$, $G_{init}=d \cdot Y$, $B_{init}=g \cdot Y$, k denotes a change rate of the color difference signal, $\Delta R=(b \cdot Cb + c \cdot Cr)$, $\Delta G=(e \cdot Cb + f \cdot Cr)$, $\Delta B=(h \cdot Cb + i \cdot Cr)$, and $R^*$, $G^*$, and $B^*$ denotes the RGB color signal converted by the RGB color signal conversion unit.

6. The color signal processing device as claimed in claim 5, further comprising:
   a change rate calculation unit calculating the charge rate of the RGB color signal when the RGB color signal changes according to the changes of the color difference signal and exists on a color space boundary of the RGB color signal.

7. The color signal processing device as claimed in claim 6, wherein the change rate calculation unit calculates a change rate of the RGB color signal through a formula as follows:

$$k_R = \frac{R^* - R_{init}}{\Delta R}; k_G = \frac{G^* - G_{init}}{\Delta G}; k_B = \frac{B^* - B_{init}}{\Delta B}$$

wherein, $k_R$ denotes a change rate of a red color(R) signal, $k_G$ denotes a change rate of a green color(G) signal, and $k_B$ denotes a change rate of a blue color(B) signal.

8. The color signal processing device as claimed in claim 7, wherein the color gamut decision unit comprises a minimum change rate selection unit selecting a minimum change rate of the change rates, $k_R$, $k_G$, and $k_B$, of the RGB color signal, which are calculated by the change rate calculation unit, and the color gamut decision unit determines the chroma scope based on the selected minimum change rate.

9. The color signal processing device as claimed in claim 8, wherein the color gamut decision unit determines the chroma scope based on an inverse number of the minimum change rate selected by the minimum change rate selection unit.

10. A color signal processing method, comprising:
    converting an input image signal into a luminance_color difference signal;
    detecting a change rate of a color difference signal when the color difference signal changes with hue and luminance remaining constant in a color space of the luminance_color difference signal;
    converting the luminance_color difference signal into an RGB color signal;
    displaying the RGB color signal;
    detecting the RGB color signal changing in a color space of the RGB color signal according to changes of the color difference signal;
    determining a color chroma scope based on a change rate of the RGB color signal according to the change rate of the color difference signal when the detected RGB color signal exists on a color space boundary of the RGB color signal; and
    displaying the color chroma scope.

11. The color signal processing method as claimed in claim 10, further comprising:
converting the image signal into any one of a YCbCr signal, a YIQ signal, and a YUV signal.

12. The color signal processing method as claimed in claim 10, further comprising:
converting the image signal into a YCbCr color signal.

13. The color signal processing method as claimed in claim 12, further comprising:
converting the luminance_color difference signal into the RGB color signal through a matrix as follows:

$$\begin{pmatrix} R \\ G \\ B \end{pmatrix} = M \begin{pmatrix} Y \\ C_b \\ C_r \end{pmatrix}$$

where M denotes a conversion matrix of 3×3, comprising $$M = \begin{pmatrix} a & b & c \\ d & e & f \\ g & h & i \end{pmatrix}.$$

14. The color signal processing method as claimed in claim 13, further comprising:
detecting changes of the RGB color signal through Formula as follows:

$R^* = a \cdot Y + b \cdot k \cdot Cb + c \cdot k \cdot Cr = a \cdot Y + k \cdot (b \cdot Cb + c \cdot Cr) = R_{init} + k \cdot \Delta R$ $G^* = d \cdot Y + e \cdot k \cdot Cb + f \cdot k \cdot Cr = d \cdot Y + k \cdot (e \cdot Cb + f \cdot Cr) = G_{init} + k \cdot \Delta G$ $B^* = g \cdot Y + h \cdot k \cdot Cb + i \cdot k \cdot Cr = g \cdot Y + k \cdot (h \cdot Cb + i \cdot Cr) = B_{init} + k \cdot \Delta B$ wherein, $R_{init} = a \cdot Y$, $G_{init} = d \cdot Y$, $B_{init} = g \cdot Y$, k denotes a change rate of the color difference signal, $\Delta R = (b \cdot Cb + c \cdot Cr)$, $\Delta G = (e \cdot Cb + f \cdot Cr)$, $\Delta B = (h \cdot Cb + i \cdot Cr)$, and R*, G*, and B* denotes the RGB color signal converted by the RGB color signal conversion step.

15. The color signal processing method as claimed in claim 14, further comprising:
calculating a charge rate of the RGB color signal when the RGB color signal changes according to the changes of the color difference signal and exists on a color space boundary of the RGB color signal.

16. The color signal processing method as claimed in claim 15, further comprising:
calculating a change rate of the RGB color signal through a formula as follows:

$$k_R = \frac{R^* - R_{init}}{\Delta R}; k_G = \frac{G^* - G_{init}}{\Delta G}; k_B = \frac{B^* - B_{init}}{\Delta B}$$

wherein, $k_R$ denotes a change rate of a red color(R) signal, $k_G$ denotes a change rate of a green color(G) signal, and $k_B$ denotes a change rate of a blue color(B) signal.

17. The color signal processing method as claimed in claim 16, further comprising:
selecting a minimum change rate of the change rates, $k_R$, $k_G$, and $k_B$ of the RGB color signal which are calculated by the change rate calculation step; and
determining the chroma scope based on the selected minimum change rate.

18. The color signal processing method as claimed in claim 17, further comprising:
determining the chroma scope based on an inverse number of the selected minimum change rate.

19. A color signal processing device, comprising:
a conversion unit converting an input image signal into an RGB color signal;
a change rate calculation unit calculating change rates of the RGB color signal when the RGB color signal changes with respect to change rates of a color difference signal on boundaries of a color space of the RGB color signal; and
a detection unit detecting the RGB color signal changing in a color space of the RGB color signal according to changes of the color difference signal; and
a color gamut decision unit determining a displayable scope of color chroma based on the change rates of the RGB color signal with respect to the change rates of the color difference signal and when the detected RGB color signal exists on the boundaries of the color space of the RGB color signal.

20. The color signal processing device as claimed in claim 19, wherein the conversion unit comprises:
a luminance color difference signal conversion unit converting the input image signal into a luminance color difference signal; and
an RGB color signal conversion unit converting the luminance_color difference signal into the RGB color signal.

21. The color signal processing device as claimed in claim 19, further comprising:
a minimum change rate selection unit selecting a minimum change rate from the change rates of the RGB color signal.

22. The color signal processing device as claimed in claim 19, wherein the color gamut decision unit determines the displayable scope of the color chroma of the input image signal to display a color signal identical to the input image signal without a memory to store coordinate values when calculating a chroma scope.

23. The color signal processing device as claimed in claim 20, further comprising:
a change rate detection unit detecting the change rate of the color difference signal when the color difference signal changes with hue and constantly maintaining color and luminance in a color space of the luminance_color difference signal.

24. The color signal processing device as claimed in claim 21, wherein the color gamut decision unit determines the scope of the color chroma based on the minimum change rate selected by the minimum change rate selection unit.

25. The color signal processing device as claimed in claim 20, wherein the luminance_color difference signal is one of a YCbCr signal, a YIQ signal, and a YUV signal.

26. The color signal processing device as claimed in claim 19, wherein the change rate of the RGB color signal refers to a change rate of each of a red color (R) signal, a green color (G) signal, and a blue color (B) signal.

27. The color signal processing device as claimed in claim 19, further comprising:
a display unit connected to the RGB color signal conversion unit and the color gamut decision unit.

28. A color signal processing method, comprising:
converting an input image signal into an RGB color signal;

calculating change rates of the RGB color signal when the RGB color signal changes with respect to change rates of a color difference signal on boundaries of a color space of the RGB color signal; and detecting the RGB color signal changing in a color space of the RGB color signal according to changes of the color difference signal; and determining a displayable scope of color chroma based on the change rates of the RGB color signal with respect to the change rates of the color difference signal and when the detected RGB color signal exists on the boundaries of the color space of the RGB color signal.

29. The color signal processing method as claimed in claim 28, further comprising:

converting the input image signal into a luminance_color difference signal; and converting the luminance_color difference signal into the RGB color signal.

30. The color signal processing method as claimed in claim 28, further comprising:

selecting a minimum change rate from the change rates of the RGB color signal.

31. The color signal processing method as claimed in claim 28, further comprising:

determining the displayable scope of the color chroma of the input image signal to display a color signal identical to the input image signal without a memory.

32. The color signal processing method as claimed in claim 29, further comprising:

detecting the change rate of the color difference signal when the color difference signal changes with hue and constantly maintaining color and luminance in a color space of the luminance_color difference signal.

33. The color signal processing method as claimed in claim 29, wherein the luminance_color difference signal is one of a YCbCr signal, a YIQ signal, and a YUV signal.

34. The color signal processing method as claimed in claim 32, wherein the change rate of the RGB color signal refers to a change rate of each of a red color (R) signal, a green color (G) signal, and a blue color (B) signal.

35. The color signal processing method as claimed in claim 34, further comprising:

calculating a color chroma C and a hue H of the image signal using a following formula:

$$C = \sqrt{Cb^2 + Cr^2}$$

$$H = \arctan\left(\frac{Cr}{Cb}\right).$$

36. The color signal processing method as claimed in claim 35, wherein when a color chroma C and a hue H of the image signal are constant, a chroma ratio of the input image signal is expressed as shown:

$$S = \frac{C}{C_{max}}$$

where, S denotes a ratio of the chroma of the input image signal to the maximum chroma ($C_{max}$).

37. The color signal processing method as claimed in claim 36, further comprising:

converting the luminance_color difference signal comprising a YCbCr signal into the RGB color signal using the following relationship:

$$\begin{pmatrix} R \\ G \\ B \end{pmatrix} = M \begin{pmatrix} Y \\ C_b \\ C_r \end{pmatrix}$$

Where M denotes a conversion matrix of 3×3, that is, $$M = \begin{pmatrix} a & b & c \\ d & e & f \\ g & h & i \end{pmatrix}.$$

and lowercase alphabet letters a~i denote elements of the matrix M.

38. The color signal processing method as claimed in claim 37, wherein the detecting of the RGB color signal is expressed as follows:

$R^* = a \cdot Y + b \cdot k \cdot Cb + c \cdot k \cdot Cr = a \cdot Y + k \cdot (b \cdot Cb + c \cdot Cr) = R_{init} + k \cdot \Delta R$ $G^* = d \cdot Y + e \cdot k \cdot Cb + f \cdot k \cdot Cr = d \cdot Y + k \cdot (e \cdot Cb + f \cdot Cr) = G_{init} + k \cdot \Delta G$ $B^* = g \cdot Y + h \cdot k \cdot Cb + i \cdot k \cdot Cr = g \cdot Y + k \cdot (h \cdot Cb + i \cdot Cr) = B_{init} + k \cdot \Delta B$ where, $R_{init} = a \cdot Y$, $G_{init} = d \cdot Y$, $B_{init} = g \cdot Y$, k denotes a change rate of the color difference signal, $\Delta R = (b \cdot Cb + c \cdot Cr)$, $\Delta G = (e \cdot Cb + f \cdot Cr)$, $\Delta B = (h \cdot Cb + i \cdot Cr)$, and R*, G*, and B* denotes the RGB color signal converted by the RGB color signal conversion unit.

39. The color signal processing method as claimed in claim 38, wherein the change rates of the R signal, the G signal, and the B signal of the RGB color signal comprise $k_R$, $k_G$, and $k_B$, respectively, and the RGB color signal is expressed as follows:

$R^* = R_{init} + k_R \cdot \Delta R$ $G^* = G_{init} + k_G \cdot \Delta G$ $B^* = B_{init} + k_B \cdot \Delta B.$ 40. The color signal processing method as claimed in claim 39, further comprising:

calculating the change rates of $k_R$, $k_G$, and $k_B$ as follows:

$$k_R = \frac{R^* - R_{init}}{\Delta R}; k_G = \frac{G^* - G_{init}}{\Delta G}; k_B = \frac{B^* - B_{init}}{\Delta B}.$$

41. The color signal processing method as claimed in claim 40, wherein when corresponding change amounts, ΔR, ΔG, and ΔB increase with respect to boundary values of the RGB color space, R*, G*, and B* are expressed as follows:

if(ΔR>0)R*=1; else R*=0;

if(ΔG>0)G*=1; else G*=0;

if(ΔB>0)B*=1; else B*=0.

* * * * *

UNITED STATES PATENT AND TRADEMARK OFFICE
CERTIFICATE OF CORRECTION

PATENT NO. : 7,129,957 B2 Page 1 of 1
APPLICATION NO. : 10/698488
DATED : October 31, 2006
INVENTOR(S) : Moon-cheol Kim It is certified that error appears in the above-identified patent and that said Letters Patent is hereby corrected as shown below:

Column 9, Line 40-41, after "claim 1" insert --,--.

Column 9, Line 44-45, after "claim 1" insert --,--.

Claim 20
Column 12, Line 26, change "luminance color" to --luminance_color--.

Claim 20
Column 12, Line 27, change "luminance color" to --luminance_color--.

Claim 37
Column 14, Line 11, change "Where" to --where--.

Signed and Sealed this

Sixth Day of March, 2007

JON W. DUDAS
*Director of the United States Patent and Trademark Office*